US005651059A

United States Patent [19]
Morgan et al.

[11] Patent Number: 5,651,059
[45] Date of Patent: Jul. 22, 1997

[54] SERVICE PACKAGE FIELD UPDATE FOR A-I-NET SCN AND SCP

[75] Inventors: Michael James Morgan, Norcross, Ga.; Bonnie Lewis Prokopowicz, Oak Park, Ill.

[73] Assignee: Lucent Technologies Inc., Murray Hill, N.J.

[21] Appl. No.: 707,365

[22] Filed: Sep. 4, 1996

Related U.S. Application Data

[63] Continuation of Ser. No. 422,665, Apr. 10, 1995, abandoned, which is a continuation of Ser. No. 83,923, Jun. 29, 1993, abandoned.

[51] Int. Cl.⁶ .................................................. H04M 3/42
[52] U.S. Cl. .......................... 379/207; 379/201; 379/242; 395/601
[58] Field of Search ........................ 379/201, 210, 379/211, 214, 207, 242, 243, 244; 370/60; 395/161, 600

[56] References Cited

U.S. PATENT DOCUMENTS

| 3,636,262 | 1/1972 | Johnson | 379/279 |
|---|---|---|---|
| 4,629,832 | 12/1986 | Carson et al. | 379/201 |
| 4,707,825 | 11/1987 | Amstutz et al. | 370/60 |
| 4,713,806 | 12/1987 | Oberlander et al. | 370/60 |
| 4,933,967 | 6/1990 | Lo et al. | 379/207 |
| 4,959,854 | 9/1990 | Cave et al. | 379/201 |
| 5,136,631 | 8/1992 | Einhorn et al. | 379/201 |
| 5,136,634 | 8/1992 | Rae et al. | 379/100 |
| 5,136,707 | 8/1992 | Block et al. | 395/600 |
| 5,212,789 | 5/1993 | Rago | 395/600 |
| 5,255,315 | 10/1993 | Bushnell | 379/221 |
| 5,257,369 | 10/1993 | Skeen et al. | 395/650 |
| 5,299,316 | 3/1994 | Suzuki | 379/201 |
| 5,329,579 | 7/1994 | Brunson | 379/67 |
| 5,355,404 | 10/1994 | LeDuc et al. | 379/201 |
| 5,361,298 | 11/1994 | Ruel et al. | 379/242 |
| 5,392,390 | 2/1995 | Crozier | 395/161 |
| 5,557,798 | 9/1996 | Skeen et al. | 395/650 |

FOREIGN PATENT DOCUMENTS

| 3159396 | 7/1991 | Japan | 379/350 |

*Primary Examiner*—Krista M. Zele
*Assistant Examiner*—Scott L. Weaver
*Attorney, Agent, or Firm*—Michael B. Johannesen

[57] ABSTRACT

A method providing updates of feature package application processes, including changing data storage structures, in a controlled manner without losing call data. A service package application field update (SPAFU) process and a replacement feature process are started on the adjunct processor system. The SPAFU process is designed to interact with both the existing and new feature processes, and, is in communication with both. For changed data structures, a mapping is created in the SPAFU process that maps the old data to the new data. For each subscriber to the feature process, the SPAFU process waits until a subscriber is not actively using the feature, and temporarily blocks calls to that feature for the selected subscriber by refusing requests for use of that feature from the subscriber, reads the database structure associated with the subscriber, applies the mapping, and populates the database structure associated with that subscriber in the new feature process. The service block is then removed and the subscriber is then serviced by the new feature process.

7 Claims, 3 Drawing Sheets

SERVICE PACKAGE FIELD UPDATE FOR A-I-NET SCN AND SCP

This application is a continuation of application Ser. No. 08/422,665, filed on Apr. 10, 1995, abandoned, which is a continuation of Ser. No. 08/083,923, filed on Jun. 29, 1993 abandoned.

TECHNICAL FIELD

This invention relates to the field of local telephone switching system features, and, more specifically, to a method for updating feature-providing processes on processors adjunct to a local telephone switching system.

BACKGROUND OF THE INVENTION

In order to be responsive to customer demand, telephone service providers require switching systems (switches) that can be updated to provide new services (features) without having to reload or rebuild the entire software package (generic) that controls call processing. Such generic rebuilding is a very long and costly procedure, especially in proportion to the cost of developing the new features themselves. Switch manufactures have responded by providing adjunct processors systems, which can be programmed to assist the switch to perform most of the call processing functions involved in one or more features, without having to change or add to the generic in the switch. Generally, feature software can be added to the adjunct without affecting other processes on the adjunct or call processing on the switch.

Feature processes in adjunct processors must themselves be updated periodically in order to provide enhanced services, to fix bugs, or to fine tune the process. Currently, such processes are updated by process replacement; that is, by terminating operation of an old process, replacing it with a new one and starting up the new process. Process replacement is required, for example, when the data structure on which the process operates needs to be changed, because no currently available update system permits the structure of data (the way that the data is stored by the process) to change without completely stopping operation of the process, removing it, and substituting another process which is capable of operating on the new data structure. While this is a much simpler method than a generic update, it cannot be done while the process is operating on calls without losing one or more calls and associated call data.

Field update is one method of changing certain operating software without stopping the operation of the process. In field update, operational software is modified by writing a segment of memory with a new program and "patching" the old program. The patch is executed by causing the old program to jump to the new program upon execution of a specific instruction and then jump back into the old program. Obviously, field update is useful only for certain changes and limited by the amount of free space for patches allocated when the original generic is built. Furthermore, the compiler that is used to build both the original program and the patches must have detailed knowledge of both the original program and the patch in order to generate the jump tables necessary to support this procedure. Most importantly, data storage structures cannot be changed by this procedure, because only programs can be changed by field update, not the data on which they operate.

Therefore, a problem in the art is that there is no way to add a feature to an operating switching system which requires changes of data storage structures without losing calls and call data.

SUMMARY OF THE INVENTION

This problem is solved and a technical advance is achieved in the art by a method that provides updating of application processes, including changing data storage structures, in a controlled manner without losing call data. Assuming an existing feature process is in operation on an adjunct processor system, in accordance with the invention a service package application field update process (SPAFU) and a new (replacement) feature process are started on the adjunct processor system. The SPAFU process interacts with both the existing and new feature processes, and, once loaded, is in communication with the existing and the new feature processes. If data structures are different or changed from the existing to the new feature process, a mapping is created and used as input to the SPAFU that maps the old data to the new data. For each subscriber to be moved to the new feature process, the SPAFU process waits until a subscriber is not actively using the feature, and temporarily blocks calls to that feature for the selected subscriber by refusing requests for use of that feature from the subscriber. The SPAFU process reads the database associated with the subscriber in the existing feature process, applies the mapping, and populates the database associated with that subscriber in the new feature process. The temporary block is then removed and service for the subscriber is switched to the new feature process. In this manner, the data controlling the feature process may migrate gracefully from the old process to the new process without losing data from the old process. One customer at a time may then be moved from the existing process to the new process while each process provides feature services for its individual customers. Advantageously, both processes are running simultaneously so that the SPAFU process communicates with them, whereby migration from one process to another may take place when there are no calls for a specific customer to be moved, so that no calls or other data is lost. When all customers are transferred, the old feature process and SPAFU process can be removed from the adjunct processor. Optionally, some subscribers may be moved to the new process and some left on the old version, if desired.

DETAILED DESCRIPTION

Figure 1:
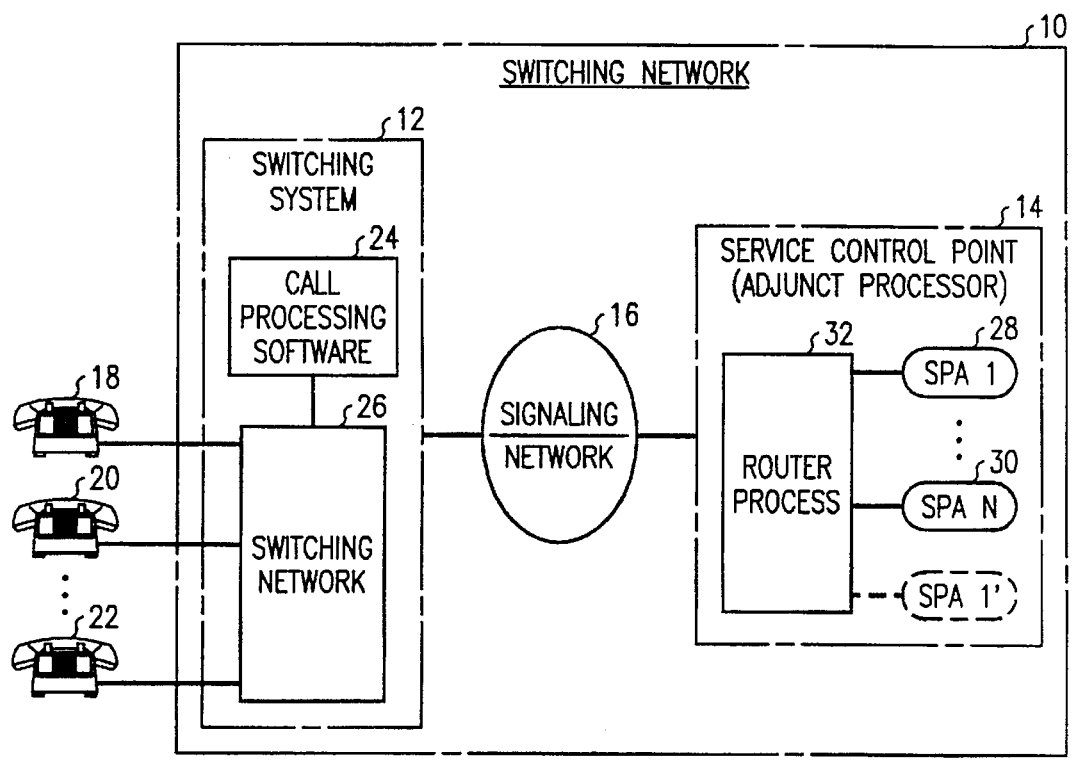
FIG. 1 is a block diagram of a prior art telephone system showing a service control point for processing certain feature requests for predetermined subscribers to a switching system.

FIG. 1 illustrates a prior art switching network 10, comprising a switching system 12 connected to a service control point (SCP) 14 via a signaling network 16. Switching system 12 may be, illustratively, a 5ESS® switch as manufactured by AT&T, or any other switch as is known in the art. Switch 12 is connected to a plurality of telephones, represented by telephones 18, 20 and 22. Switch 12 provides connections from telephones 18, 20 and 22 to each other and to other telephones. Switch 12 establishes such connections by call processing software 24 which controls the interconnectivity of switching network 26, as is known in the art.

In order to provide flexible features as described above, switch 12 is connected to a service control point 14 via a signaling network 16. Service control point 14, which is an example of an adjunct processor, generally comprises a computer, such as a 3B20D computer manufactured by AT&T. Signaling network 16 comprises, for example, a CCS7 network as specified in CCITT signaling system No. 7. In some systems, SCP 14 may be an adjunct processor connected to switch 12 by data lines, as known in the art.

In operation, one or more of telephones 18, 20 and 22 may have access to one or more features. For purposes of this disclosure, "features" means services such as call forwarding, three-way calling, calling name delivery (displaying the name of the calling party at the called party telephone), area number calling (routing of a call based on the calling party's location) and other such services. This list is not meant to be exclusive, but is to be considered exemplary of features that may be affected by this invention. In this exemplary embodiment, call processing software 24 does not itself perform all of the processing for the features. Instead, call processing software 24 is assisted by service process application (SPA) processes SPA 1–SPA N, represented by processes 28 and 30. Each SPA process represents a different feature to aid call processing software 24 in configuring switching network 26 according to the type of feature or service provided by the SPA. When call processing software 24 detects a request for a feature provided by an SPA process, it sends a message across signaling network 16. Router process 32 determines which SPA process receives the message and delivers it to the appropriate SPA. The SPA process that receives a message responds by processing the request and sending configuration information back across signaling network 16.

According to one example of the teachings of the prior art, in order to update or fix bugs in SPA 1, 28 a new process SPA 1' (shown in phantom) is built as known in the art, loaded onto SCP 14 (if not built on SCP 14) the old process SPA 1' is removed and the new process SPA 1 is made operational. At this time, the router process 32 is informed to start delivering new requests for features to SPA 1' instead of SPA 1. All data regarding individual subscribers must be preloaded prior to the cutover of SPA 1'. If SPA 1' were properly built, then call processing will proceed. If there is a bug or error in SPA 1' then no call processing can occur and a cutback to SPA 1 is required. During any cutover, all calls in progress are lost and any data that may have been changed during the transaction may be lost. Therefore, a system is needed that can allow data to change, preserve calls, and gracefully move from one SPA process to a replacement.

Figure 2:
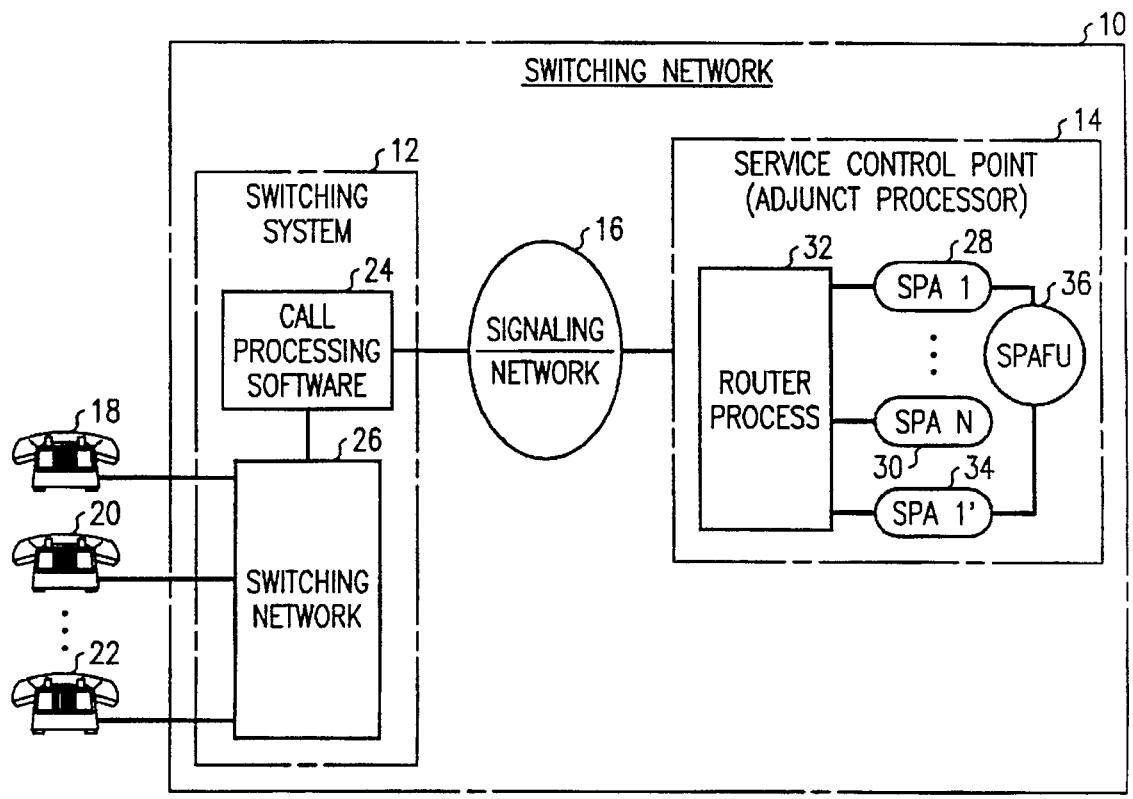
FIG. 2 is a block diagram of a telephone system, similar to FIG. 1, wherein an exemplary embodiment of this invention is used to update processes in a service control point.

Turing now to FIG. 2, switching network 10 is illustrated having, as in FIG. 1, a switching system 12 connected to an SCP 14 via a signaling network 16. Switch 12 includes a switching network 26 under control of call processing system 24 interconnecting telephones 18, 20 and 22 to each other and to other telephones (not shown for clarity).

Switch 12 provides features that are not available directly through call processing software 24. When one of these features is invoked, for example, by telephone 18 signaling to call processing system 24, call processing system 24 sends a message to SCP 14 via signaling network 16. Router process 32 receives the message from signaling network 16 at SCP 14, determines that the message is for the feature supported by SPA 1 28, and delivers the message to SPA 1 28. SPA 1 28 processes the information in the message, as described above in connection with FIG. 1, and sends directions to call processing system 24 for connections of switch network 26.

In order to replace SPA 1 28 with SPA 1 34, according to the exemplary embodiment of this invention, replacement process SPA 1'34 is built, along with a mapping which is generated during the building process defining how the data used by SPA 1 28 compares (maps) to the data expected by SPA 1'34. SPAFU 36 is also built so that it can use the mapping in order to transfer data from SPA 1 28 to SPA 1'34.

On a subscriber by subscriber basis, SPAFU 36 causes the SPA 1 28 to tell router process 32 to block requests for features for that subscriber when there are no currently active calls using SPA 1 28. After calls are blocked, SPAFU copies the operational data for the blocked subscriber from SPA 1 28 to SPA 1'34 and processes the data according to the mapping. Such processing may include adding data fields, deleting fields, moving fields around, and making fields larger or smaller.

Figure 3:
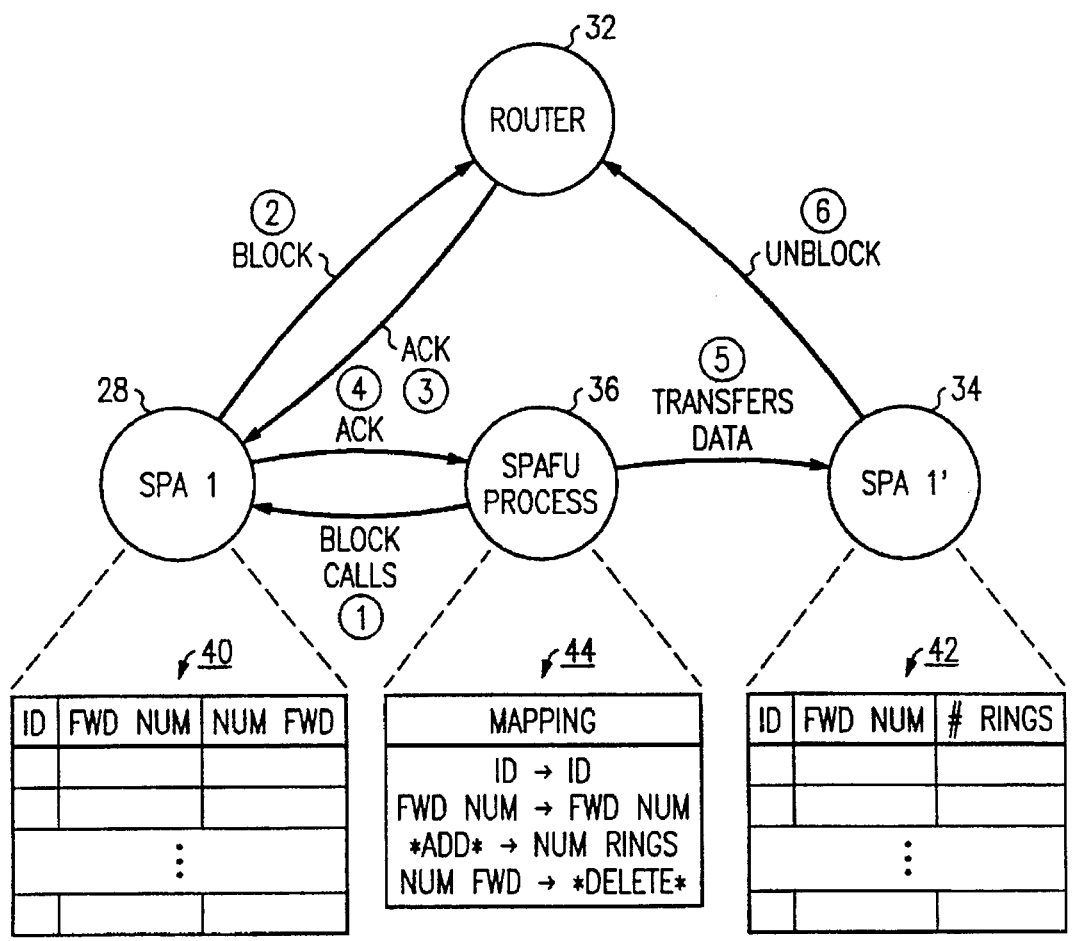
FIG. 3 is a block diagram of a service control point as illustrated in FIG. 2 according to an exemplary embodiment of this invention illustrating the sequence of operations.

Turning now to FIG. 3, a more detailed drawing of the processes in the adjunct processor 14 of FIG. 2 is shown. Also shown in FIG. 3 is a sequence of actions taken by the method according to an exemplary embodiment of this invention. This example will be described using a system wherein the service process SPA 1 28 provides call forwarding. This invention is not, however, limited to call forwarding and could be used for any service provided by an adjunct processor.

Associated with the call forwarding feature in SPA 1 28 is a data structure 40. Data structure 40 contains the information needed to implement call forwarding in this example. There are several fields associated with the call forwarding feature. A first field is an ID field identifying the line or user. The second field is the directory number to which all calls are to be forwarded, and the last field is the directory number of the telephone that has the call forwarding feature.

In this exemplary embodiment, SPA 1 process 28 is being updated to SPA 1'34. SPA 1'34 includes data structure 42 containing information from which it will operate. Data structure 42 includes the ID of the line, the directory number to be forwarded to, and the number of rings (a new, user-definable option). SPA 1'34 does not include the number forwarded as it was determined that this number is duplicative of the ID field and, therefore, not needed.

In order to update SPA 1 28 to SPA 1'34, a SPAFU process 36 is loaded into the adjunct system and started. SPA 1'34 is also loaded and started. SPAFU process 36 includes a mapping 44 which was generated when the SPA 1' process was built by comparing the data structure required by the original process 40 with the data structure required by the new process 42. The mapping tells the SPAFU process 36 how to populate the fields of data structure 42 from information found in data structure 40. In mapping 44 the ID fields from 40 map (or transfer) directly into ID field 42. The forward number field (FWD NUM) maps directly into the forward number field of 42. A new field is added, which is the number of rings. Optionally, there can be a default value placed in the number of rings, such as 2 if the desired value is not known in advance. Finally, the directory number forwarded (NUM FWD) is deleted according to mapping 44.

In the simple call forwarding scenario, according to this exemplary embodiment, the user may change the value in fields as part of the feature. In this example, a user may change the forward directory number at any time, in order to set or change the directory number of the forwarded-to telephone. Therefore, the SPAFU process must maintain any forward directory number from an original process to a replacement process and must not interrupt SPA 1 process while it is updating any fields in data structure 40.

In response to this, SPAFU process 36 first sends a block call message (number 1) to SPA 1 28 to block calls for a specific subscriber (ID). SPA 1 28 then determines if it is processing any calls for that ID, which includes changing or setting a forward number. If it is, SPA 1 28 waits until it is finished processing and then sends a block message (number 2) to router 32. After router 32 blocks service request messages for that ID number to SPA 1 28 it sends an acknowledgement back (number 3). After SPA 1 28 receives acknowledgement from the router 32, it sends an acknowledgement (number 4) to SPAFU process 36 so that SPAFU process 36 knows that it can begin to transfer data.

SPAFU process 36 starts to transfer data (number 5) by transferring for the ID number. The forward number is then transferred. SPAFU process 36 adds a number of rings which could include a default number in this instance, and does nothing with the forward number since it is being deleted. SPAFU process 36 moves the data to SPA 1'34 which populates data structure 42. After the data has been transferred, SPA 1'34 sends an unblock message (number 6) to router 32, which includes address of SPA 1'34. Router 32 then routes all call forwarding requests for that ID to SPA 1'34. SPAFU process 36 continues this procedure for each ID in database 40. Alternatively, a specified subset of IDs could be moved during a given time period. After all of the IDs have been moved, SPA 1 28 may be removed. Furthermore, a given subset of IDs may be left on SPA 1 28 and the rest transferred to SPA 1'34.

Advantageously, blocking service requests may be varied according to the needs of the feature being updated or the service provider. If desired, blocking may be desirable regardless of whether calls or call data exist in the old SPA to provide, for example, a faster update at the expense of lost call data. Further, blocking may be delayed until there are no calls, which results in calls being blocked for a shorter period of time; however, the ability of the SPAFU process to complete its task may be compromised because a particular subscriber may never become idle. Additionally, the SPAFU process may wait for a specifiable period of time for a subscriber to become idle. The SPAFU process may then optionally proceed regardless of the busy/idle status, or try again at a later time.

It is to be understood that the above-described embodiments are merely illustrative principles of the invention and that many variations may be devised by those skilled in the art, without departing from the scope of the invention. It is, therefore, intended that such variations be included within the scope of the claims.

We claim:

1. A method, for use in a computer system, for replacing a first process with a replacement process, said first process using a first plurality of sets of subscriber data to provide one or more services for a plurality of subscribers, each of said plurality of subscribers being associated with one of said first plurality of sets of subscriber data, each of said first plurality of sets of subscriber data having a first predefined data structure, said replacement process using a second plurality of sets of subscriber data to provide one or more services for said plurality of subscribers, each of said plurality of subscribers being associated with one of said second plurality of sets of subscriber data, each of said second plurality of sets of subscriber data having a second predefined data structure, wherein said first predefined data structure is different from said second predefined data structure, said method comprising the steps of:

a. generating a mapping of data defining the difference between said first and said second predefined data structures and specifying processing required to transform said subscriber data from said first data structure to said second data structure, said mapping being generated when said replacement process is built;

b. providing said replacement process and said mapping in said computer system;

c. selecting one of said plurality of subscribers;

d. blocking request for service from said selected subscriber;

e. populating a set of subscriber data associated with said selected subscriber in said replacement process by comparing said set of subscriber data associated with said selected subscriber from said first process to said mapping processing said data from said set of subscriber data associated with said selected subscriber from said first predefined data structure according to said mapping, and writing said processed set of subscriber data associated with said selected subscriber in said replacement process in said second predefined data structure; and f. subsequent to said populating, unblocking requests for service from said selected subscriber, and directing further requests for service from said selected subscriber to said replacement process, after which said selected subscriber is served by said replacement process and any other subscribers not yet selected are served by said first process.

2. The method of claim 1 wherein each of said predefined data structures defines a location for data items in each of said sets of subscriber data and wherein said processing comprises:

changing the location of at least one of said data items of said set of subscriber data associated with said selected subscriber relative to other data items in said set of subscriber data.

3. The method of claim 1 wherein said processing comprises:

creating a data field in the set of subscriber data associated with said selected subscriber for said replacement process, which does not correspond to any data field in said set of subscriber data associated with said selected subscriber for said first process.

4. The method of claim 1 wherein said processing further comprises:

creating a data structure in said set of subscriber data associated with said selected subscriber for said replacement process for a new data item.

5. The method of claim 1 wherein said step of selecting comprises selecting a subset of said plurality of subscribers;

said step of blocking comprises blocking requests for services from said selected subset of said plurality of subscribers; and said step of populating further comprises populating subscriber data associated with said selected subset of said plurality of subscribers from said first process to said replacement process at one time.

6. The method of claim 1 further comprising prior to said step of blocking requests for service, waiting until no processing is occurring with respect to said selected subscriber before initiating said step populating said set of subscriber data associated with said selected subscriber.

7. The method of claim 1 further comprising repeating steps c through f until all of said plurality of subscribers are served by said replacement process and then removing said first process from said computer system.

* * * * *